Oct. 5, 1926.
H. FORD
DRIVE
Filed Oct. 5, 1923
1,602,021
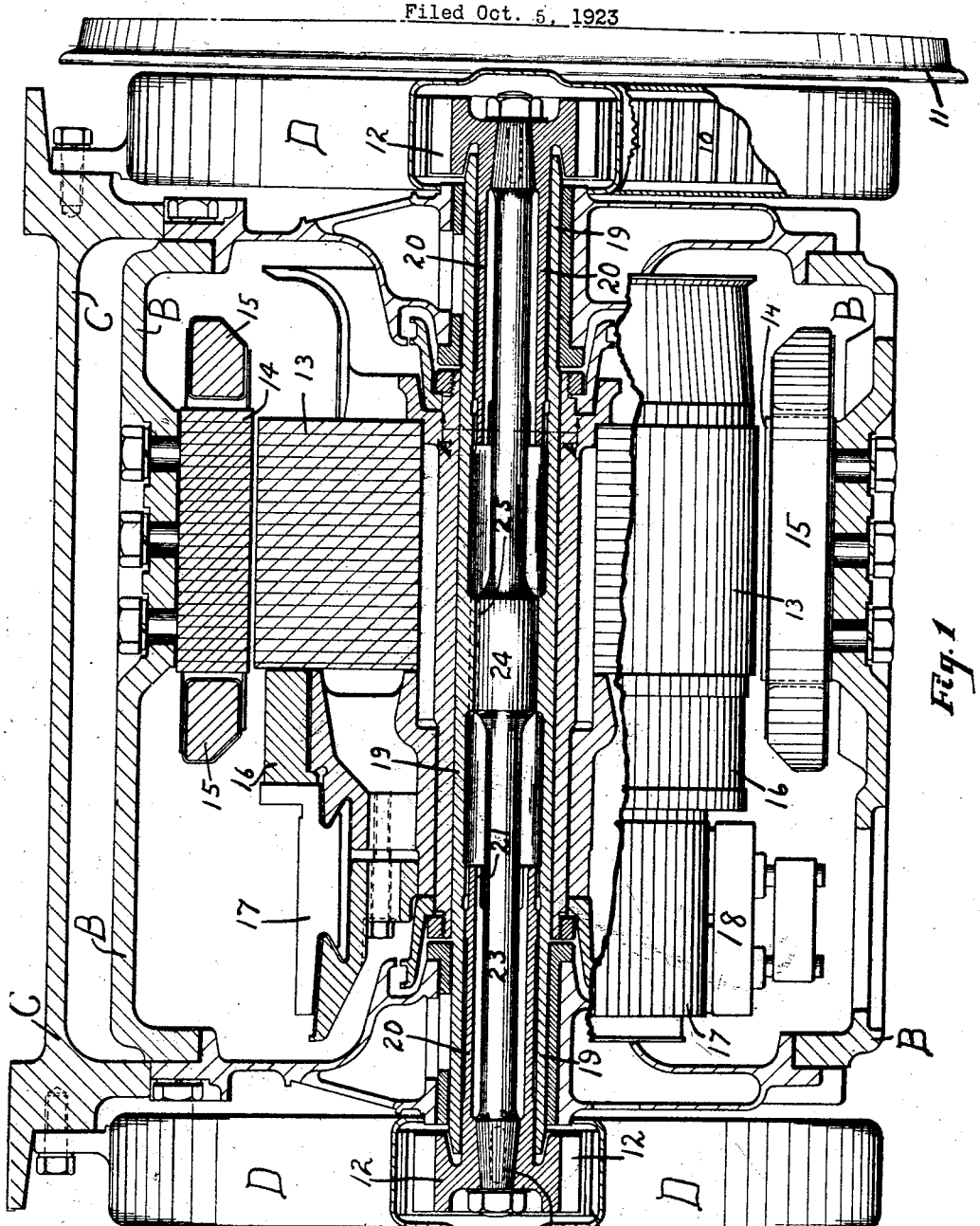
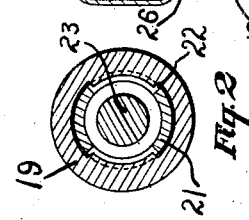
WITNESS:
INVENTOR.
Henry Ford.
BY
ATTORNEY.

Patented Oct. 5, 1926.

1,602,021

UNITED STATES PATENT OFFICE.

HENRY FORD, OF DEARBORN, MICHIGAN.

DRIVE.

Application filed October 5, 1923. Serial No. 666,729.

The object of my invention is to provide new and useful improvements in a drive for vehicles such as locomotives, of simple, durable, and inexpensive construction.

A further object of my invention is to provide a drive which will be especially useful in connection with electrically propelled vehicles which run on rails such as street cars and locomotives.

A further object of my invention is to provide between the traction wheels and an electric motor a somewhat yielding connection, having associated therewith means for limiting the amount of yield whereby a positive drive may be secured under all circumstances and a slight yield will occur in connection with the inequalities of a track so that the danger of breaking the drive connections and the wear on the driving connections between the electric motor and the traction wheels will be largely lessened.

A further object of my invention is to provide a pair of driving connections between the electric motor and the traction wheels, one of these driving connections being somewhat flexible and the other being substantially inflexible so that the flexible driving connection may ordinarily furnish the connection between the motor and the traction wheels but that when the strain on the flexible connection is sufficient to cause it to yield beyond a given amount, then the inflexible driving connection will automatically prevent further yielding.

With these and other objects in view, my invention consists in the arrangement, combination and construction of the various parts of my improved device, as described in the specification, claimed in my claim, and shown in the accompanying drawings, in which:—

Figure 1 shows an elevation of an electric motor and its connections with means for driving traction wheels, certain of the parts being broken away to more clearly illustrate the construction, and Figure 2 shows a vertical sectional view taken on the line A—A of Figure 1.

Referring to the accompanying drawings, I have used the reference letter "B" to indicate generally the housing for an electrical motor which is suitably secured by clamps, screws, bolts, or the like to a frame member "C". At the end of the housing "B", gear housings "D" are mounted which support the ends of the housing "B" and are similarly secured and supported by the frame "C". Within these housings "D" are large gear 10 which are designed to be mounted on shafts within the housings "D" and be suitably connected with traction wheels 11 disposed next to the housing "D" and which will ordinarily be mounted on the ends of the shafts on which the gears 10 are fixed. That is, the gears 10 may be mounted on the axle shaft for the vehicle and the traction wheels for the vehicle are located at ends of the axle outside of the gears 10.

Within the housing "D" and meshing with the gears 10 are drive gears 12 which are secured to the ends of the motor shaft. The motor itself is indicated by the various broken away parts illustrated in Figure 1 where 13 indicates the laminations of the armature, 14 the laminations of the field coils, 15 the field coils proper, 16 the armature coils, 17 the commutator parts, and 18 the motor brushes. These parts are all mounted in the housing "B" in a manner which has heretofore been in use and in fact all the parts which have heretofore been described are well known in the art of constructing electric locomotives.

My invention consists of substituting for the substantially rigid drive shaft ordinarily provided in the motor, the combination drive shaft which will now be described:

Mounted inside the armature of the motor and fixed of course to the armature laminations 13 is a substantially rigid sleeve 19 which extends out into each housing "D" a short distance. The drive gears 12 have sleeves 20 formed integrally therewith which extend into the sleeve 19. These sleeves 20 are very carefully fitted to the interior of the sleeves 19 so that when they are pressed into place rotary movement may occur between the two sleeves but there will be no appreciable lateral play between these sleeves.

In the form of device here shown the sleeve 20 is formed with splines 21 designed to coact with corresponding channels 22 formed in the sleeve 19 adjacent to the inner ends of the sleeves 20. These splines and grooves are so formed as to permit a limited rotary movement between the sleeves 20 and the sleeve 19. From the construction of the parts heretofore described it will be seen that when the motor armature rotates, the sleeve 19 through the splines 21 will form a positive driving connection with the sleeves 20, thereby positively driving the gears 12.

Mounted within the sleeve 20 is a driving shaft 23 which has an enlarged portion 24 at the central part thereof designed to be received with a "press fit" in the central portion of the sleeve 19. This enlarged portion 24 is further keyed as indicated by the dotted line 25 to the sleeve 19. It will be noted that the sleeve 19 has a contracted portion at its central part in which the enlarged portion of the shaft 23 fits so that the assembly of the shaft 23 and the keying thereof within the sleeve 19 is a comparatively simple assembly job. The ends of the shaft 23 are keyed at 26 to the central opening in the gears 12. The shaft 24 is keyed to the sleeve 19 and the drive gears 12 in such position that the splines 21 will normally stand midway between the limits of their movement within the grooves 22. The shaft 23 is further composed of such material that a limited twisting thereof due to the torque of the motor will not injure the structure of the shaft appreciably. This shaft 23 is further constructed of such strength that the normal driving stresses of the motor will not materially twist it but extraordinary strains such as irregularities in the rails on which the vehicle is running will be able to twist the shaft slightly.

The splines 21, as have been heretofore noted, are so formed that a slight twist will be permitted but that the twisting of the shaft 21 will be limited by the splines so that it cannot reach a dangerous point.

Among the many advantages resulting from my new driving connection, it should be specifically pointed out that where a substantially rigid driving connection is used between a motor and traction wheels, then the innumerable sharp strains placed upon the drive by irregularities of the rails have a material tendency to crystallize the metal of the driving parts and to cause considerable wear thereon whereas with my improved slightly flexible drive a large proportion of these sharp shocks are cushioned by the slight yield of the shaft 23 and the driving parts are correspondingly of longer life and safer. Further advantages may result from the use of this improved drive in connection with other than electrical motors or in connection with other than vehicles.

Some changes may be made in the arrangement and construction of the various parts of my improved device without departing from the spirit of the invention therein, and it is my intention to cover by my claims such changes as may be reasonably included within the scope thereof.

I claim as my invention:—

In a drive, a motor having an armature, a sleeve fixed to said armature and extending therefrom in either direction, driving members disposed at each end of said sleeve, means for rotatably mounting said driving members at the ends of such sleeve, means adjacent to the end portions of the sleeve for limiting the rotary movement of said driving members relative to said sleeve, and a shaft having its central portion fixed to the central portion of the sleeve and its ends fixed to the driving members whereby the driving members may be permitted slight rotary motion relative to each other and the armature, such motion being permitted by the elasticity of said shaft and whereby limited movement of the ends of the shaft relative to the central part thereof may occur.

HENRY FORD.